(12) United States Patent
Newberg et al.

(10) Patent No.: US 7,808,948 B2
(45) Date of Patent: Oct. 5, 2010

(54) METHODS FOR INFORMING MOBILE STATIONS OF CONTROL CHANNEL ARCHITECTURES

(75) Inventors: Donald G. Newberg, Hoffman Estates, IL (US); Thomas B. Bohn, McHenry, IL (US); Shaun R. Fenton, Tadley (GB); Christine M. Pappas, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 767 days.

(21) Appl. No.: 11/119,275

(22) Filed: Apr. 29, 2005

(65) Prior Publication Data

US 2006/0221887 A1   Oct. 5, 2006

Related U.S. Application Data

(60) Provisional application No. 60/666,529, filed on Mar. 30, 2005.

(51) Int. Cl.
*H04W 4/00* (2009.01)
*H04W 72/00* (2009.01)
*H04B 7/212* (2006.01)

(52) U.S. Cl. .................. 370/329; 370/347; 455/452.1

(58) Field of Classification Search .............. 370/310, 370/328, 329, 336, 337, 345, 347, 348; 455/450, 455/452.1

See application file for complete search history.

(56) References Cited

U.S. PATENT DOCUMENTS

| 5,875,187 A | | 2/1999 | Amin | |
|---|---|---|---|---|
| 6,026,300 A | * | 2/2000 | Hicks | ............... 455/434 |
| 6,047,160 A | * | 4/2000 | Priest et al. | ............... 455/11.1 |
| 6,236,856 B1 | | 5/2001 | Abbadessa | |
| 6,272,352 B1 | * | 8/2001 | Cerwall et al. | ............... 455/511 |
| 2004/0082333 A1 | | 4/2004 | Ito | |

\* cited by examiner

*Primary Examiner*—Michael T Thier
(74) *Attorney, Agent, or Firm*—Valerie M. Davis

(57) ABSTRACT

A method for informing mobile stations of a control channel architecture for a wireless communications system is disclosed. At a controller in the wireless communications system, the controller sends a control channel architecture message on a broadcast channel. The control channel architecture message informs the mobile station of a control channel architecture for the wireless communications system. At a mobile station in the wireless communications system, the mobile station receives a control channel architecture message on a broadcast channel, retrieves information relating to the control channel architecture from the received control channel architecture message, and performs control channel processing using the retrieved information.

12 Claims, 5 Drawing Sheets

METHODS FOR INFORMING MOBILE STATIONS OF CONTROL CHANNEL ARCHITECTURES

FIELD OF THE INVENTION

The present invention relates generally to wireless communications systems and in particular to the field of control channel architectures in wireless communications systems.

BACKGROUND

A wireless communications system generally comprises of a number of "mobile stations," where the mobile stations are typically the endpoints of a communications link, and communications infrastructure comprising base stations and controllers, where the communications infrastructure is typically stationary and the intermediaries by which a communications link to a mobile station may be established or maintained. To establish or maintain the communications link to a mobile station, there is an exchange of information specifically concerned with the establishment and control of communications links. In a trunked system, such exchange of information is termed "signaling" and takes place on a control channel of the wireless communications system.

There are many types of control channel architectures that a wireless communications system can use. For example, a wireless communications system may utilize a dedicated control channel, may utilize a dynamic (also known as non-dedicated) control channel that supports both control signaling and traffic on the same channel, or may distribute the control channel functionality among a number of RF channels. For example, a system with a large number of RF frequencies may utilize a dedicated control channel whereas a system with a small number of RF frequencies may utilize a dynamic control channel architecture so that the number of channels in the wireless communications system may be optimized. In another example, a system that supports many traffic channels may allocate multiple slots of a TDMA channel for a control channel functionality whereas a system that supports few traffic channels may allocate a single slot of a TDMA channel for a control channel functionality so that the number of channels in the wireless communications system may be optimized. In another example, a system operating under one set of spectrum regulations may utilize a dedicated control channel whereas a system operating under another set of spectrum regulation may utilize distributed control channel architecture so that the legal restrictions can be met.

Normally, the communications infrastructure comprises of one type of control channel architecture, e.g. a single dedicated control channel, and that control channel architecture does not change. In such a case, the mobile station does not need to be informed of the control channel architecture because the mobile station knows of the control channel architecture a priori as well as other system related parameters for the mobile station to operate with the communications infrastructure. Thus, there is no need to inform the mobile station of the control channel architecture where the control channel architecture does not change.

It would be beneficial to have a communications infrastructure that dynamically changes the control channel architecture based upon performance of the wireless communications system or the operator's need to allocate RF resources between control and traffic. In such a case, the communications infrastructure would need to inform the mobile stations in the wireless communications system of the control channel architecture. Further, it would be beneficial to be able to accommodate disparate wireless communications systems where the control channel architecture may be of one type in one wireless communications system and of another type in another wireless communications system. In such a case, the communications infrastructure would need to inform the mobile stations moving from one system to the other of the different control channel architectures.

Accordingly, there is a need to inform mobile stations of control channel architectures.

BRIEF DESCRIPTION OF THE FIGURES

The present invention is illustrated by way of example and not limitation in the accompanying figures, in which like references indicate similar elements, and in which.

Figure 1:
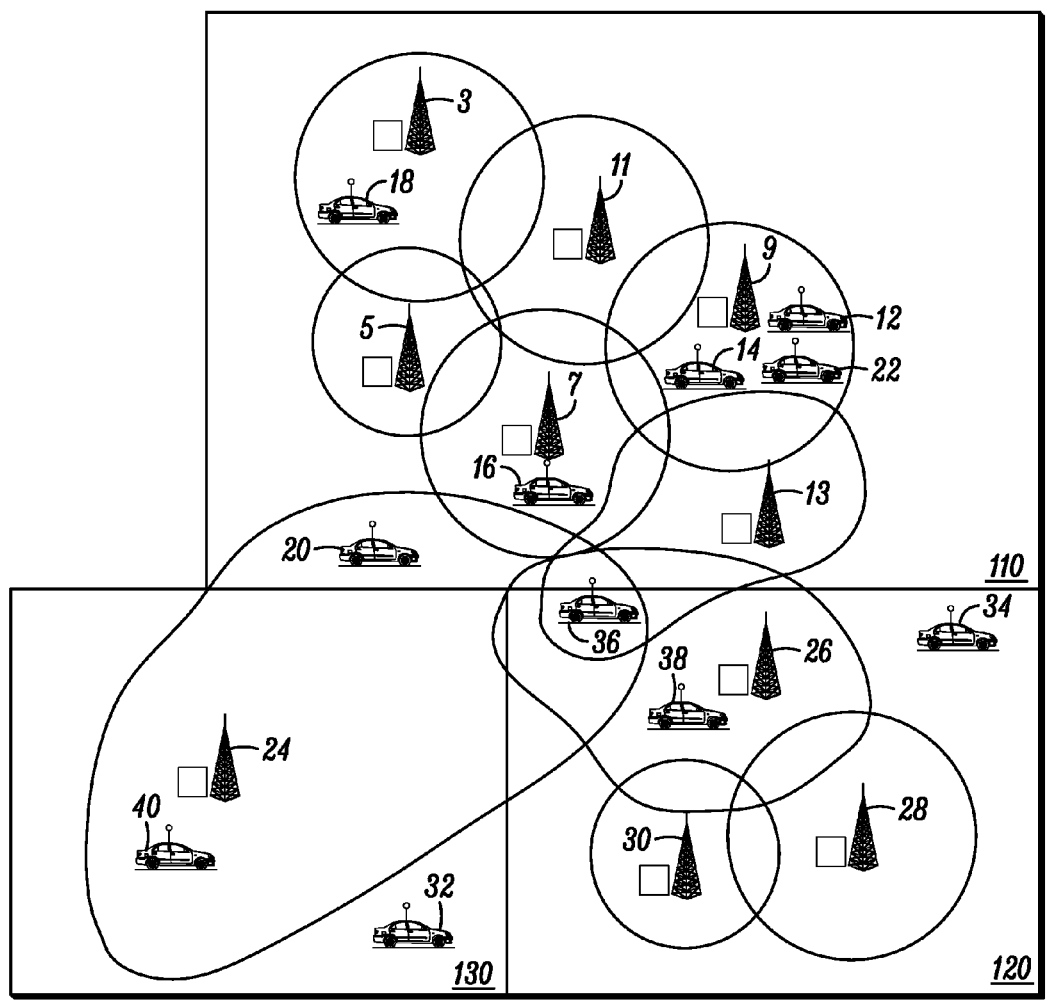
FIG. 1 is an example of a simple block diagram illustrating a wireless communications landscape in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments of the present invention, it should be observed that the present invention resides primarily in combinations of method steps and apparatus components related to control channel architectures. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring now to FIG. 1, there is shown an example wireless communications landscape 100 having system 110, system 120, and system 130. The illustrated example has three systems 110, 120, 130 whereby a system is comprised of a multiplicity of communications resources of RF frequencies, base stations (BSs) and mobile stations (MSs) managed by system controllers (not shown) whereby the MSs send and receive communications with BSs (also known as "repeaters"). In one embodiment, one system controller (not shown) may be associated with a base station, e.g. base station 24, or one system controller (not shown) may be associated with each system, e.g. system 110. In either case, the system controller manages the operation of the system, e.g. system 110. Namely, as described herein, in one embodiment, the system controller informs mobile stations of the control channel architecture for the system.

System 110 comprises a plurality of cells, each with a BS 3, 5, 7, 9, 11, 13 typically located at the center of the cell, and a plurality of MSs 12, 14, 16, 18, 20, 22 all of which are communicating on RF frequencies assigned to system 110. The MSs 12, 14, 16, 18, 20, 22 in system 110 operate on all the RF frequencies associated with the BSs 3, 5, 7, 9, 11, 13 in system 110. System 120 comprises a plurality of cells, each with a BS 26, 28, 30 typically located at the center of the cell, and a plurality of MSs 34, 36, 38 all of which are communicating on RF frequencies assigned to system 120. The MSs 34, 36, 38 of system 120 may include all the RF frequencies associated with BSs 26, 28, 30. Further, MS 36 may operate on all RF frequencies associated with the BSs in system 110 and with the BS in system 130 since the MS 36 is sufficiently close to all three systems 110, 120, 130. System 130 comprises a cell with a BS 24 and MSs 32, 40 all of which are communicating on RF frequencies assigned to system 130.

A BS preferably comprises fixed equipment for communicating data/control and voice information to and from the MSs for facilitating communications between the MSs in the wireless communications landscape 100. A MS preferably comprises mobile or portable devices (such as an in-car or handheld radios or radio telephones) capable of communicating with a BS using time division multiple access (TDMA) techniques as further described herein, in which specified time segments are divided into assigned time slots for individual communications. As is known in the art, each RF frequency in the system carries time slots whereby each time slot is known as a "channel."

In an illustrative embodiment of the present invention, the wireless communications landscape 100 assumes that each system is a two slot TDMA communications system; however, other slotting ratios may be used in the TDMA communications system and still remain within the spirit and scope of the present invention. In such an embodiment, since there are two slots, there are two channels available on each RF frequency for carrying the traffic of the system.

Figure 2:
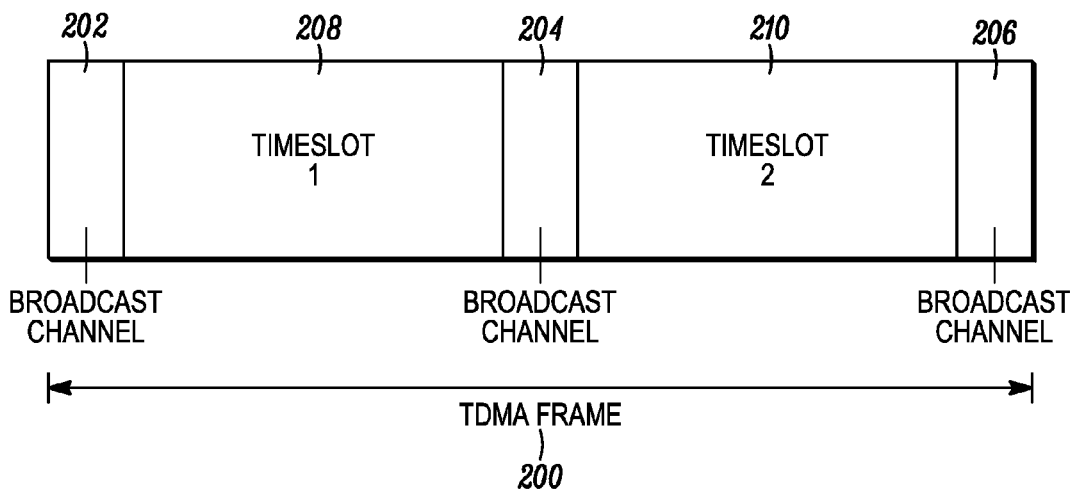
FIG. 2 is an example TDMA frame in accordance with some embodiments of the invention.

In an illustrative embodiment of the present invention, as shown in FIG. 2, a TDMA frame 200 comprises broadcast channels 202, 204, 206 and timeslots 208, 210. The broadcast channel 202, 204, 206 occupies the time between timeslots 208, 210. As described herein, a control channel architecture defines the contents of the timeslots of the TDMA frame 200. For example, a dedicated control channel architecture utilizes at least one of the timeslots for carrying control messages (where the at least one timeslot is dedicated for control) and utilizes the other timeslot for traffic or control. For example, a dedicated control channel architecture may use timeslot 1 208 for control and timeslot 2 210 for traffic. As is known in the art, when the time slot is used for control information it is referred to as a control channel.

Figure 3:
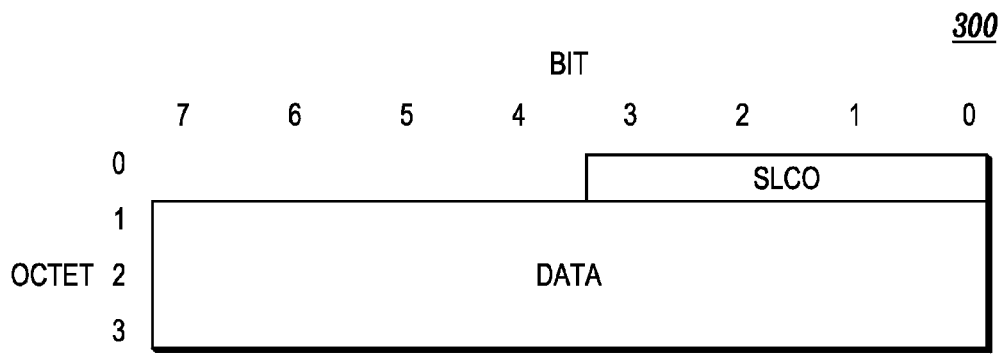
FIG. 3 is an example control channel architecture message in accordance with some embodiments of the invention.

In an exemplary embodiment, the broadcast channel 202, 204, 206 is known as a Common Announcement Channel (CACH) and is a logical channel of a TDMA system where the CACH carries control channel architecture information in a specific message wherein the specific message is termed a control channel architecture message. In yet another exemplary embodiment, the CACH carries control channel architecture information in a control channel architecture message that adheres to a short link control (short LC) message where the short LC message is described in ETSI standard TS 102 361 and the like. Shown in FIG. 3 is an example short LC message 300 as defined in ETSI standard TS 102 361.

Figure 4:
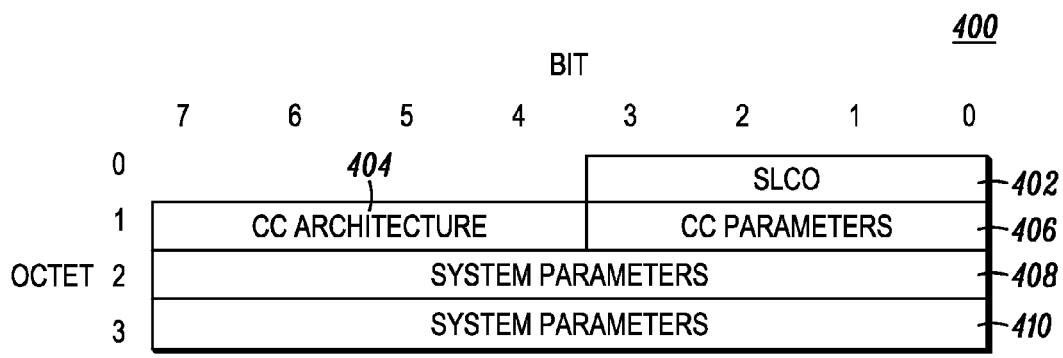
FIG. 4 is an example short link control message in accordance with some embodiments of the invention.

In an exemplary embodiment, the short LC message 300 is utilized to convey a control channel architecture information of the system, e.g. system 110. Referring to FIG. 4, shown is an exemplary message structure for the short LC message 400 where the short LC message 400 conveys information relating to the control channel architecture, descriptors for the control channel architecture, and other relevant system information. A short link control opcode (SLCO) 402 field defines the contents of the message. A CC Architecture 404 field describes the architecture of the control channel. For example, the CC Architecture 404 field may identify that the control channel is dedicated or that it is dynamic (also generally referred to as non-dedicated). A CC Parameters 406 field further describes and/or modifies the CC Architecture 404 field. For example, the CC Parameters 406 field may indicate which slot the control channel is currently active on if the CC Architecture 404 field indicates that a dynamic control channel architecture is being used. System Parameter fields 408, 410 may further provide information such as system identification and alternate control frequencies.

In an exemplary embodiment, the short LC message 400 of FIG. 4 provides information regarding a number of control channel architectures, a number of which are described as follows. The short LC message may convey information about a control channel architecture having a dedicated control channel where both of the TDMA channels in a 2 channel TDMA system are used as control channels and only as control channels. The short LC control message may convey information about a control channel architecture having a dedicated control channel where channel 1 serves the control channel and channel 2 is used for traffic. The short LC message may convey information about a control channel architecture having a dedicated control channel where channel 2 serves as the control channel and channel 1 is used for traffic. Whether channel 1 or channel 2 is used as a dedicated control channel, the CC Parameters 406 field may be used to indicate the types of traffic that can be sent over the other timeslot channel. For example, mobile stations may be restricted to sending only a certain type of traffic, e.g. Short Messing Service traffic, over a specific channel, e.g. channel 1. Alternative types of restrictions include restricting the mobile station from location updates, voice, and/or data communications. Further types of restrictions include allowing for only emergency services, mobile targeted data, infrastructure targeted data, and specific users.

The short LC message may also convey information about a control channel architecture having a dynamic control channel. For example, either channel 1 or channel 2 or both channel 1 and channel 2 may be used for traffic. When the channel is not carrying traffic, the channel reverts to functioning as a control channel. In the dynamic control channel architecture, the CC Parameters 406 field indicates whether channel 1, channel 2, both channel 1 and channel 2, or neither channel 1 or channel 2 is currently available as a control channel. When neither channel 1 nor channel 2 is available as a control channel, the control channel architecture message indicates that the base station will allocate a control channel as soon as a channel becomes available.

The short LC message may convey information about a control channel architecture having a distributed control channel where either channel 1, or channel 2, or both channel 1 or channel 2 may be used for traffic. For example, at one moment, channel 1 may function as a control channel and another moment, channel 2 may function as a control channel. When the channel is not carrying traffic, the channel reverts to functioning as a control channel. In the distributed control channel architecture, the CC Parameters 406 field indicates whether channel 1, channel 2, both channel 1 and channel 2, or neither channel 1 or channel 2 is currently available as a control channel. When neither channel 1 nor channel 2 is available as a control channel, the System Parameters 408, 410 fields could indicate an alternate frequency that is free to use as a control channel or could indicate an alternate frequency that is free to use as a traffic channel.

The short LC message may convey information about a conventional traffic channel that does not support a control channel. In environments where conventional and trunked systems share frequencies, the short LC message may be sent out periodically on a conventional system's CACH to indicate that no control channel is available.

Figure 5:
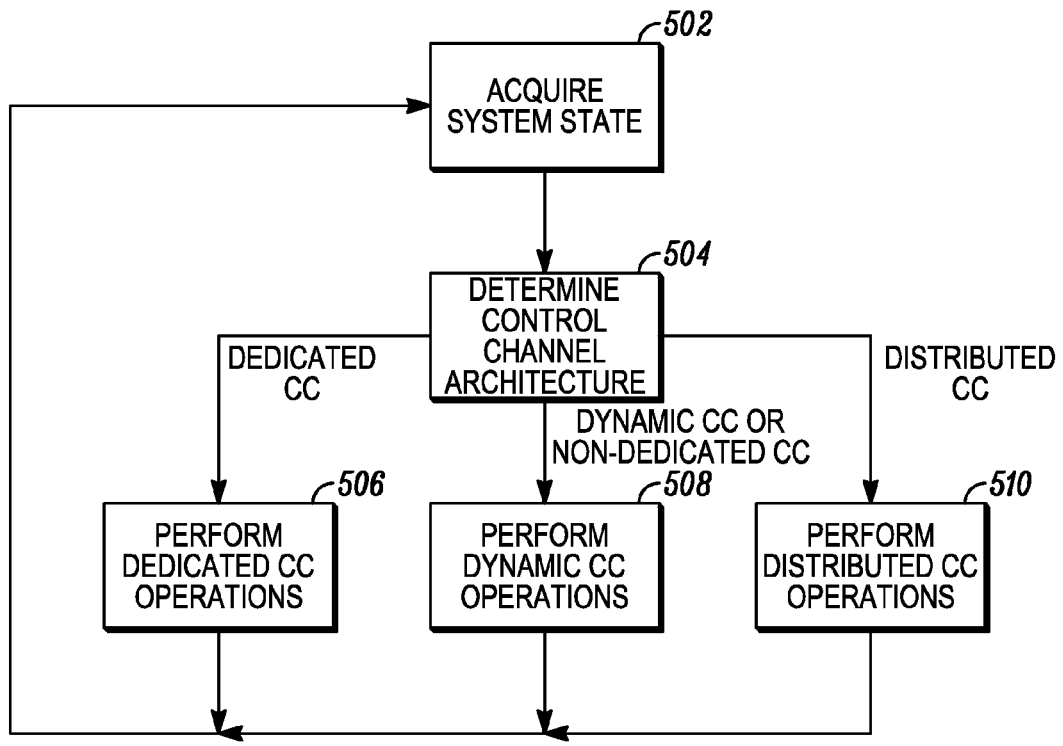
FIG. 5 is a flow diagram of the operation of a system controller in accordance with some embodiments of the invention.

Within the scope of an embodiment of the present invention is a method for informing a mobile station of control channel architectures. Referring to FIG. 5 is a flow chart for a process performed by a system controller to inform a mobile station, e.g. mobile station 16, of the control channel architecture for the system, e.g. system 110. Even though the following description is made with reference to a system controller of the system, e.g. system 110, an embodiment of the present invention is contemplated to work in a base station, e.g. base station 7, of the system 110 where a system controller is not present. Further, in one embodiment, the system controller may be a part of the base station, e.g. base station 7, for the system 110. Thus, the mention of the system controller is not meant to be a limitation and is used for clarity of description.

In operation, the system controller acquires knowledge of the system state (Block 502). Knowledge of system state includes understanding the system features, e.g. the need to support an emergency feature, and the like. Knowledge of system state includes understanding frequency restrictions such as whether the frequencies are shared with other systems. In one embodiment, knowledge of the system further requires the controller to maintain statistics of the number of mobile stations, the number of calls, the type of traffic (e.g. voice or data), quality of service parameters, the number of frequencies, and the like. From the knowledge of the system, the system controller determines a control channel architecture for the system (Block 504). For example, if there are a small e.g. two, number of frequencies, then the system controller may determine a dynamic control channel architecture. In contrast, if the system supports an emergency application, the system controller may determine a dedicated control channel architecture. For example, if the frequencies are shared with other systems, the system controller may determine a distributed control channel architecture.

In any case, the controller determines a control channel architecture wherein a change in the control channel architecture is made based upon knowledge of system state. For example, a change occurs in at least one of a change in a number of available traffic channels, a change in a type (e.g. voice or data) of active calls, a change in a number of active calls, a change in a type (e.g. emergency services, message trunked voice calls, transmission trunked voice calls) of feature supported, and a change in a number of available RF channels for control.

If the system controller has decided to operate in with dedicated control channel architecture, then the system controller performs dedicated control channel processing (Block 506). The block of dedicated control channel processing is described below with reference to FIG. 6. If the system controller has decided to operate with a dynamic control channel architecture, then the system controller performs dynamic control channel processing (Block 508). The block of dynamic control channel processing is described below with reference to FIG. 7. If the system controller has decided to operate with a distributed control channel architecture, then the system controller performs distributed control channel processing (Block 510). The block of distributed control channel processing is described below with reference to FIG. 8.

Figure 6:
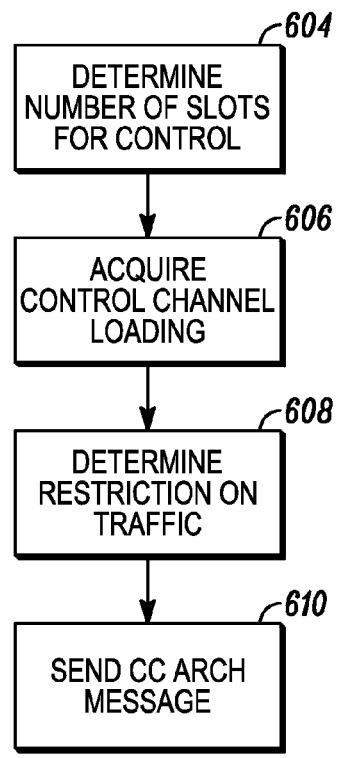
FIG. 6 is a flow diagram of the operation of a system controller when performing dedicated control channel processing in accordance with some embodiments of the invention.

Referring to FIG. 6, if the system controller has determined to operate with a dedicated control channel architecture, then the system controller determines the number of slots to be allocated for control (Block 604). That is, the system controller determines whether the system should be a one slot dedicated control channel architecture or a two slot dedicated control channel architecture. The system controller acquires control channel loading (Block 606) to determine whether there should be restrictions on the type of traffic (Block 608) that takes place on the traffic channel. In one embodiment, the system controller analyzes traffic on the control channel and/or traffic channel to determine restrictions on traffic. In one embodiment, the CC Parameters field of the short LC message is used to indicate restrictions on the type of traffic that can be sent over the control channel. Finally, the system controller formulates a control channel architecture message to convey the determined control channel architecture and determined traffic restrictions (if any) and sends the control channel architecture message to a mobile device.

Figure 7:
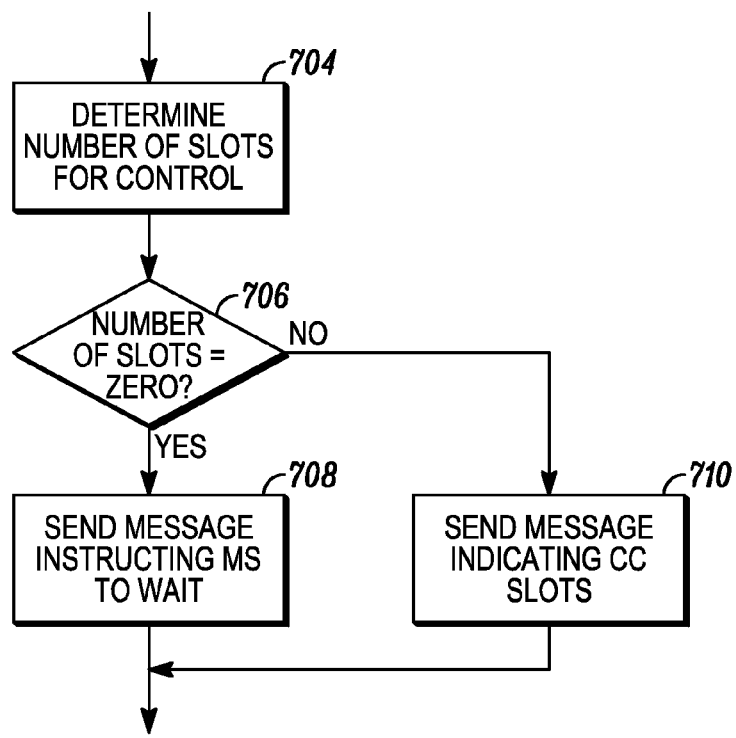
FIG. 7 is a flow diagram of the operation of a system controller when performing dynamic control channel processing in accordance with some embodiments of the invention.

Referring to FIG. 7, if the system controller has determined to operate with a dynamic control channel architecture, then the system controller determines the number of slots to be allocated for control (Block 704). That is, the system controller determines whether the system should be a one slot dynamic control channel architecture or a two slot dynamic control channel architecture. In one embodiment, the CC Parameters field of the short LC message is used to indicate the availability of the control channel. Then, the system controller determines whether the number of slots is equal to zero, that is whether a slot is available to be used as a control channel (Block 706). If the number of slots is zero, that is no slots are available for control, then the system controller sends a control channel architecture message to the mobile station where the control channel architecture message informs the mobile station to wait until a control channel becomes available (Block 708). If the number of slots is not zero, that is a slot is available for control, then the system controller sends a control channel architecture message to the mobile station where the control channel architecture message informs the mobile station of the slot to be used as a control channel (Block 710).

Figure 8:
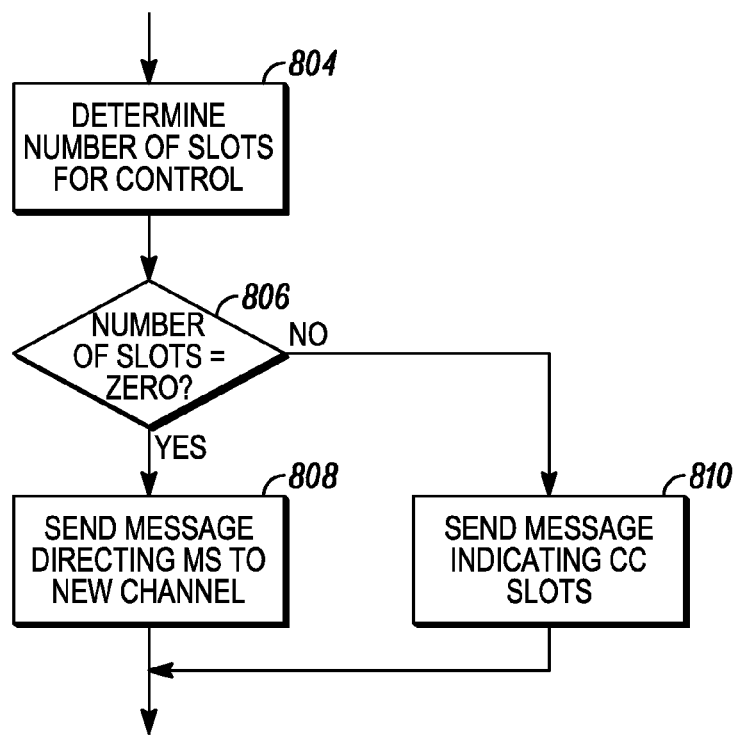
FIG. 8 is a flow diagram of the operation of a system controller when performing distributed control channel processing in accordance with some embodiments of the invention.

Referring to FIG. 8, if the system controller has determined to operate with a distributed control channel architecture, then the system controller determines the number of slots to be allocated for control (Block 804). That is, the system controller determines whether the system should be a one slot distributed control channel architecture, a two slot distributed control architecture, or whether both TDMA channels are to be distributed control channels. In one embodiment, the CC Parameters field of the short LC message is used to indicate the availability of the control channel. Then, the system controller determines whether the number of slots is equal to zero, that is whether a slot is available to be used as a control channel (Block 806). If the number of slots is zero, that is no slots are available for control, then the system controller sends a control channel architecture message to the mobile station where the control channel architecture message informs the mobile station of an alternate frequency that is free to use as a control channel, a traffic channel, or both (Block 808). In one embodiment, the Systems Parameter field of the short LC message is used to indicate the alternate frequency. If the number of slots is not zero, that is a slot is available for control, then the system controller sends a control channel architecture message to the mobile station where the control channel architecture message informs the mobile station of the slot to be use as a control channel (Block 810).

Figure 9:
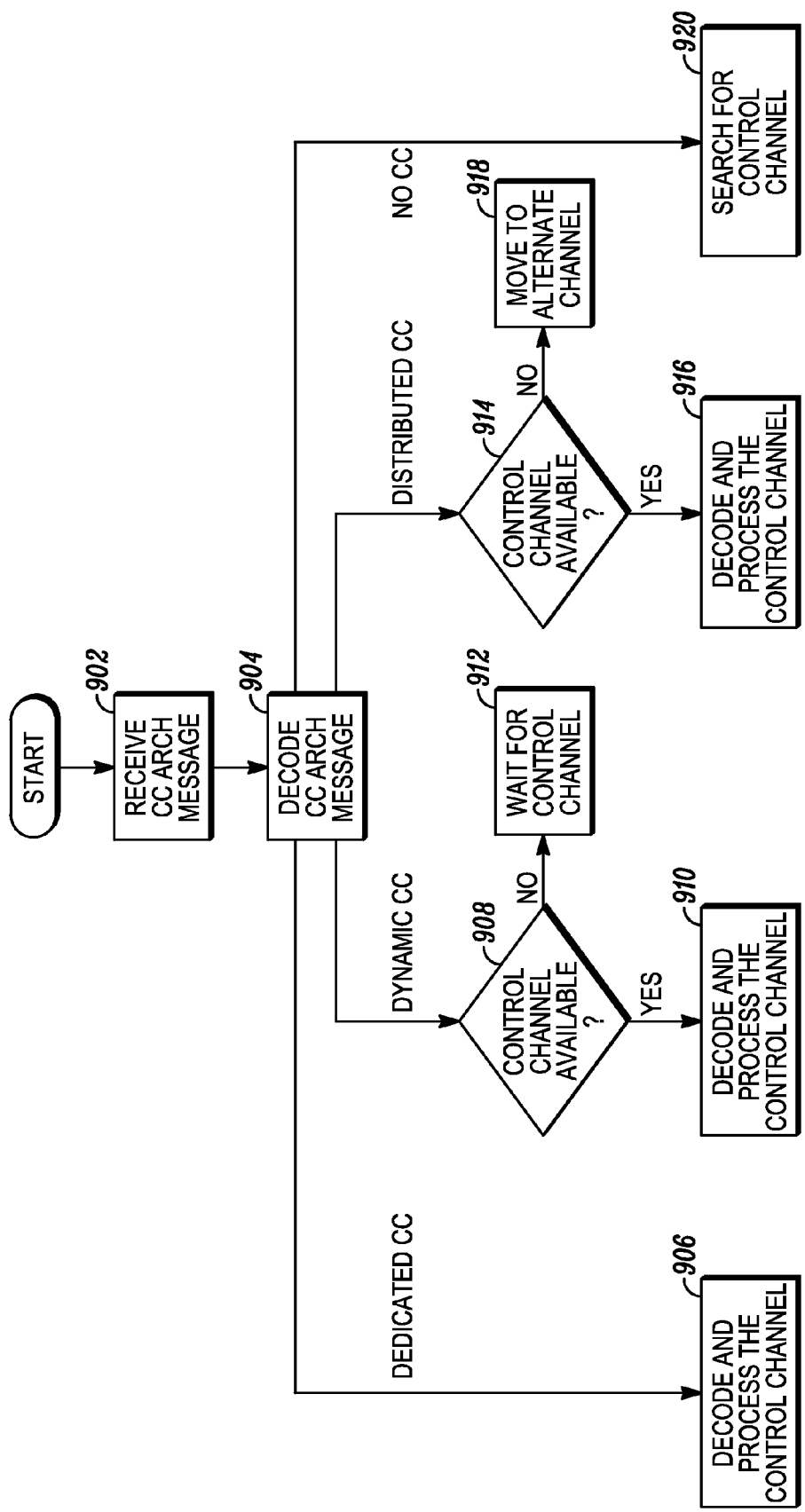
FIG. 9 is a flow diagram of the operation of a mobile station in accordance with some embodiments of the invention.

Referring to FIG. 9, shown is a flow chart for the process performed by a mobile station, e.g. mobile station 16, when it is informed of the control channel architecture for the system 110. In operation, the mobile station receives the control channel architecture message (Block 902) and decodes the control architecture message to determine a control channel architecture for the system 110 (Block 904). In an exemplary embodiment, the control channel architecture message is a short LC message as shown in FIG. 4. If the determined control channel architecture is a dedicated control channel, then the mobile station knows that a control channel exists and decodes signaling on the control channel (Block 906). If the determined control channel architecture is a dynamic control channel, then the mobile station determines whether a control channel is available (Block 908). If a control channel is available, then the mobile station knows that a control channel exists and decodes signaling on the control channel (Block 910). If a control channel is not available, then the mobile station waits until a control channel is available (Block 912). If the determined control channel architecture is a distributed control channel, then the mobile station determines whether a control channel is available (Block 914). If a control channel is available, then the mobile station knows that a control channel exists and decodes signaling on the control channel (Block 916). If a control channel is not available, then the mobile station is moved to an alternate control channel (Block 918). In any case, if the mobile station is not able to determine the control channel architecture, the mobile station searches for a control channel in the system 110 (Block 920). Finally, the mobile station performs the steps of FIG. 9 whenever it receives a control channel architecture message. Thus, the mobile station may be operating in one control channel architecture, e.g. a dedicated control channel architecture, for a specific period of time and may switch to another control channel architecture, e.g. distributed control channel architecture, after receiving a control channel architecture message. In such a fashion, the control channel architecture for the system 110 may be dynamically changed.

In any event, the control channel architecture is communicated to the mobile station in a control channel architecture message. In one embodiment, the control channel architecture message is a short LC message as illustrated in FIG. 4. In yet another embodiment, the control channel architecture message is a short LC message as illustrated in FIG. 4 and communicated on the CACH of the system, e.g. system 110.

It will be appreciated that embodiments of the present invention described herein may be comprised of one or more conventional processors and unique stored program instructions that control the one or more processors to implement, in conjunction with certain non-processor circuits, some, most, or all of the functions of the adjacent site updates described herein. The non-processor circuits may include, but are not limited to, a radio receiver, a radio transmitter, signal drivers, clock circuits, power source circuits, and user input devices. As such, these functions may be interpreted as steps of a method to perform adjacent site updates. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for informing mobile stations of a control channel architecture for a wireless communications system, the method comprising the step of:
   at a controller in the wireless communications system:
      acquiring knowledge of a state of the communication system;
      changing a first control channel architecture for the communication system to a second different control channel architecture based on the state of the communication system, wherein the first control channel architecture is selected from a first set consisting of a dedicated control channel architecture having at least one channel dedicated for control information, a dynamic control channel architecture comprising a plurality of channels that includes at least one channel that supports both control signaling and traffic on the same channel and wherein the dynamic control channel architecture further supports zero control channels being available during a time when each of the plurality of channels is being used as a traffic channel, or a distributed control channel architecture, and the second control channel architecture is the dynamic control channel architecture;

sending a control channel architecture message on a broadcast channel wherein the control channel architecture message informs the mobile station of the second dynamic control channel architecture and further provides an indication to the mobile station that zero control channels are currently available because each of the plurality of channels is being used as a traffic channel.

2. The method of claim 1 wherein the broadcast channel is at least one of a logical of a TDMA system and a Common Announcement Channel (CACH) where the CACH is a logical channel of a TDMA system.

3. The method of claim 1 wherein the control channel architecture message is a short Link Control (LC) message that adheres to ETSI TS 102 361.

4. The method of claim 1 wherein the change occurs in at least one of a change in a number of available traffic channels, a change in a type of active calls, a change in a number of active calls, a change in a type of feature supported, and a change in a number of available RF channels for control.

5. The method of claim 1 wherein the control channel architecture message indicates a number of TDMA slots allocated for control.

6. The method of claim 5 where when the number of TDMA slots allocated for control is zero, the message instructs the mobile station to at least one of a) move to a different traffic channel, b) move to a different control channel, c) wait for slots to be allocated for control, and d) move to a specified control channel.

7. The method of claim 1 wherein the control channel architecture message informs the mobile station about an alternate control channel.

8. The method of claim 1 wherein the control channel architecture message informs the mobile station of restrictions on types of traffic that the mobile station can transmit on slots that are not allocated to control.

9. A method for informing mobile stations of a control channel architecture for a wireless communications system, the method comprising the step of:
at a controller in the wireless communications system:
acquiring knowledge of a state of the wireless communications system;
determining a control channel architecture based upon the acquired knowledge; and
sending a short Link Control (LC) message on a Common Announcement Channel (CACH) wherein the short LC message informs the mobile station of the control channel architecture for the wireless communications system, wherein the control channel architecture is changeable from a first control channel architecture to a second different control channel architecture based on the acquired knowledge of the state of the communication system, wherein the first control channel architecture is selected from a first set consisting of a dedicated control channel architecture having at least one channel dedicated for control information, a dynamic control channel architecture comprising a plurality of channels that includes at least one channel that supports both control signaling and traffic on the same channel and wherein the dynamic control channel architecture further supports zero control channels being available during a time when each of the plurality of channels is being used as a traffic channel, or a distributed control channel architecture, wherein the second control channel architecture is the dynamic control channel architecture, and wherein the short LC message further provides an indication to the mobile station that zero control channels are currently available because each of the plurality of channels is being used as a traffic channel.

10. A method for informing mobile stations of a control channel architecture for a wireless communications system, the method comprising the step of:
at a mobile station in the wireless communications system:
receiving a control channel architecture message on a broadcast channel wherein the control channel architecture message informs the mobile station of a current control channel architecture for the wireless communications system, wherein the current control channel architecture has changed from a first different control channel architecture based on acquired knowledge of a state of the communication system, wherein the first control channel architecture is selected from a first set consisting of a dedicated control channel architecture having at least one channel dedicated for control information, a dynamic control channel architecture comprising a plurality of channels that includes at least one channel that supports both control signaling and traffic on the same channel and wherein the dynamic control channel architecture further supports zero control channels being available during a time when each of the plurality of channels is being used as a traffic channel, or a distributed control channel architecture, and wherein the current control channel architecture is the dynamic control channel architecture;
retrieving information relating to the current control channel architecture from the received control channel architecture message including retrieving from the control channel architecture message an indication that zero control channels are currently available because each of the plurality of channels is being used as a traffic channel; and
performing control channel processing using the retrieved information.

11. The method of claim 10 wherein the broadcast channel is at least one of a logical of a TDMA system and a Common Announcement Channel (CACH) where the CACH is a logical channel of a TDMA system.

12. The method of claim 10 wherein the control channel architecture message is a short Link Control (LC) message that adheres to ETSI TS 102 361.

* * * * *